(12) United States Patent
Kay

(10) Patent No.: US 6,804,492 B2
(45) Date of Patent: Oct. 12, 2004

(54) HIGH VOLUME UPLINK IN A BROADBAND SATELLITE COMMUNICATIONS SYSTEM

(75) Inventor: Stan Kay, Rockville, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 674 days.

(21) Appl. No.: 09/825,635

(22) Filed: Apr. 4, 2001

(65) Prior Publication Data

US 2002/0147011 A1 Oct. 10, 2002

(51) Int. Cl.[7] ............................................. H04B 7/185
(52) U.S. Cl. ...................... 455/12.1; 455/427; 455/428; 370/323; 370/325
(58) Field of Search ................................ 455/427, 12.1, 455/452.1, 13.2, 428, 452.2, 450, 455, 429, 7, 13.1; 370/325, 323, 315, 316

(56) References Cited

U.S. PATENT DOCUMENTS

| | | | | |
|---|---|---|---|---|
| 5,926,745 A | * | 7/1999 | Threadgill et al. | ......... 455/12.1 |
| 6,141,534 A | * | 10/2000 | Snell et al. | ................. 455/12.1 |
| 6,205,319 B1 | * | 3/2001 | Wiswell et al. | ............ 455/12.1 |
| 6,246,360 B1 | * | 6/2001 | Brand et al. | ................. 342/352 |
| 6,366,761 B1 | * | 4/2002 | Montpetit | ................... 455/12.1 |
| 6,366,776 B1 | * | 4/2002 | Wright et al. | ............... 455/427 |
| 6,665,518 B1 | * | 12/2003 | Courtney et al. | .......... 455/12.1 |

* cited by examiner

*Primary Examiner*—Nay Maung
*Assistant Examiner*—Raymond Dean
(74) *Attorney, Agent, or Firm*—John T. Whelan

(57) ABSTRACT

In a communication system with a bandwidth-on-demand processor, which may be power limited and connected to a myriad of terminals via relatively long delay paths, and another processor, which is connected to a few terminals via relatively short delay paths, an approach for effectively coordinating the processors is disclosed. A bandwidth controller receives a message requesting bandwidth from a remote processor and selectively grants the bandwidth request. The bandwidth controller transmits an assignment message that specifies a bandwidth allocation to the remote processor, and concurrently transmits a control message. A switch is configured to forward the assignment message to the remote processor. A controller is coupled to the switch and is configured to receive the control message, wherein the control message provides bandwidth allocation. The above arrangement has particular applicability to a satellite communications system.

15 Claims, 9 Drawing Sheets

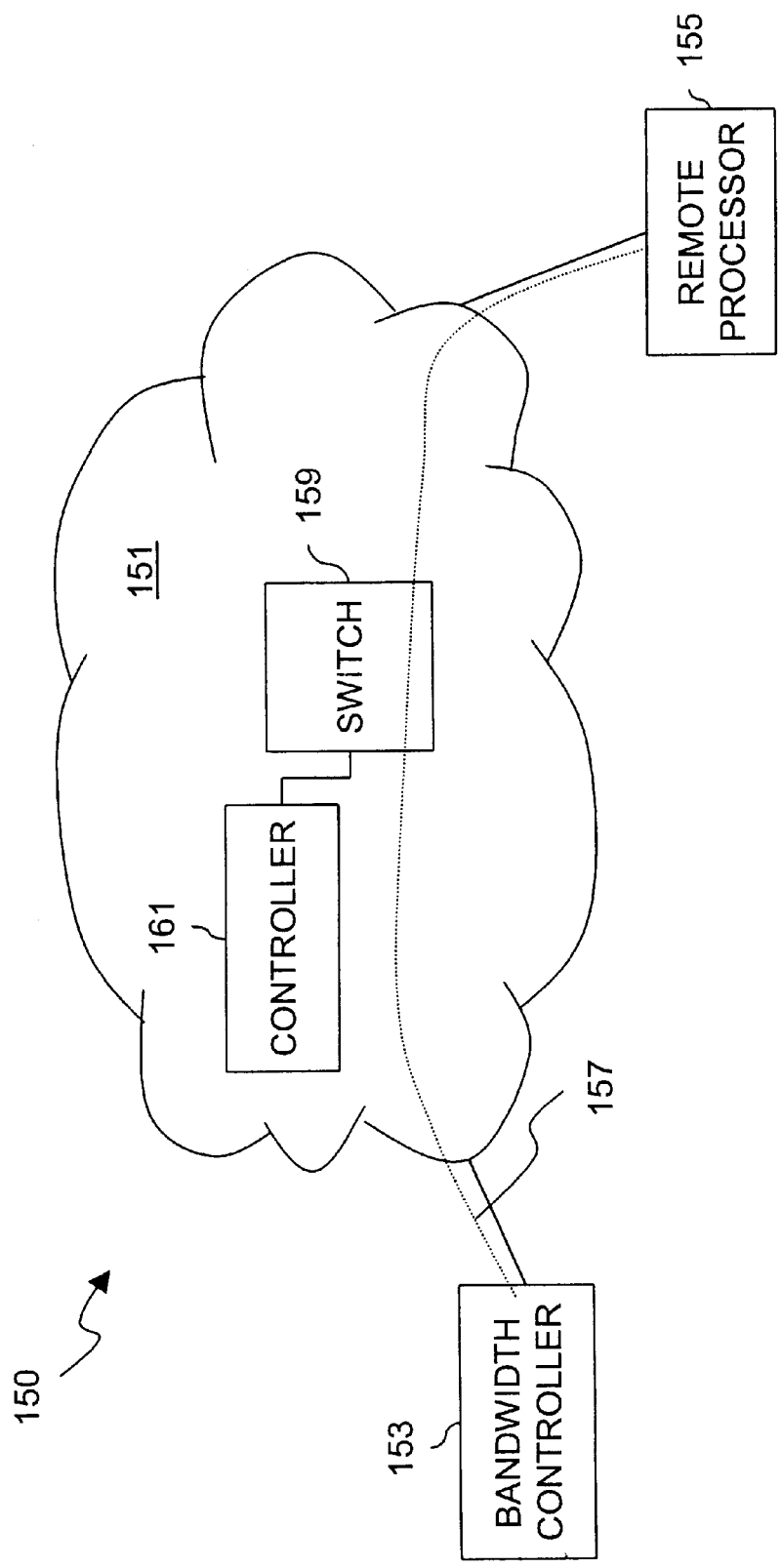

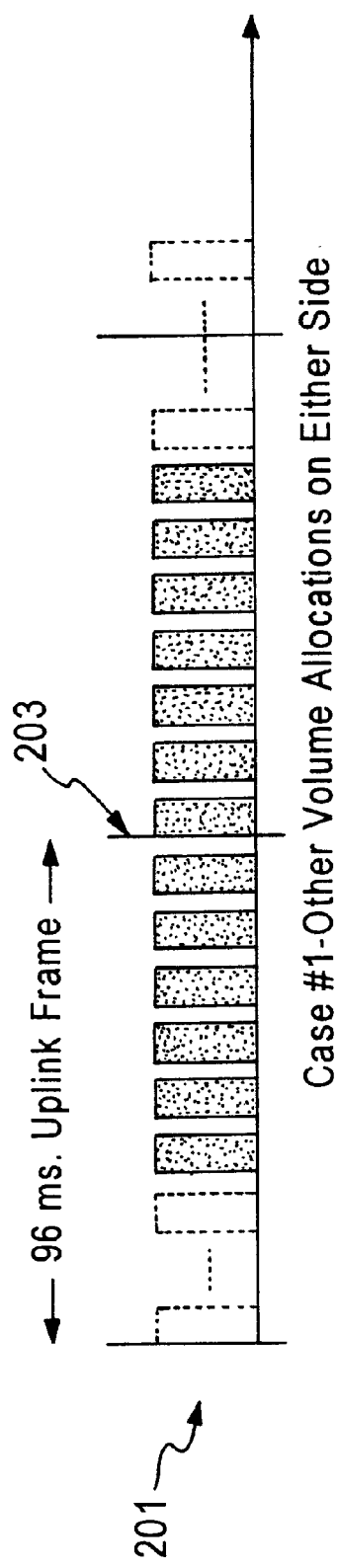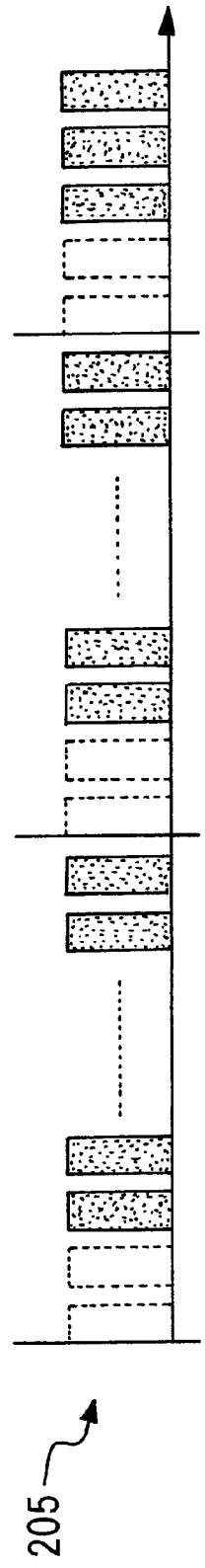
FIG. 2A  
FIG. 2B

FIG. 3A

| Dest. Address | Uplink Rate | Request Type | Rate Request | Dest. Downlink | Request Priority |
|---|---|---|---|---|---|
| 301 | 303 | 305 | 307 | 309 | 311 |

| Source Address | Rate/No. of Slots | Last |
|---|---|---|
| 321 | 323 | 325 |

| Source Address | Request ID | Type |
|---|---|---|
| 341 | 343 | 345 |

340

HIGH VOLUME UPLINK IN A BROADBAND SATELLITE COMMUNICATIONS SYSTEM

BACKGROUND OF THE INVENTION

1. Field of the Invention

The present invention relates generally to communication systems, and is more particularly related to providing bandwidth-on-demand in a switching communication system.

2. Discussion of the Background

As society, in general, become increasingly reliant on communication networks to conduct a variety of activities, ranging from business transactions to personal entertainment, communication engineers continually face the challenges of optimizing use of network capacity and ensuring network availability to a diverse set of users with varying traffic requirements. Because capacity requirements of different users, for that matter of the same users, can fluctuate depending on time day and applications, the accuracy of traffic forecasts is diminished. Inaccurate forecasts can lead to negative effects, such as traffic congestion, slow response times, or even loss data. The maturity of electronic commerce and acceptance of the Internet as a daily tool by millions of users (this user base continues to grow) only intensify the need to develop techniques to streamline capacity usage. With the advances in processing power of desktop computers, the average user has grown accustomed to sophisticated multimedia applications, which place tremendous strain on network resources (e.g., switch capacity). Also, because the decrease in application response times is a direct result of the increased processor performance, the user has grown less tolerant of network delays, demanding comparable improvements in the network infrastructure. Therefore, efficient use of network capacity is imperative, particularly in systems where capacity needs to be managed carefully, such as a satellite network.

Satellite communications systems have emerged as an accessible and reliable network infrastructure that can support the exchange of voice, video, and data traffic. Conventionally, these satellite communications systems offer dedicated communication channels that relay or tunnel traffic without processing such traffic (i.e., "bent-pipe"). That is, the system has no knowledge of what types of protocols are used or data that is contained within the packets. One drawback with these satellite communications systems is that they are highly inefficient with respect to bandwidth allocation to the numerous satellite terminals (STs). For example, if the satellite has excess transponder bandwidth at a particular time, this excess capacity cannot be temporality reallocated to another ST. Another drawback is that the satellite cannot perform any processing on the received traffic; thus, key networking functions, such as flow control and congestion control, are not available. Yet another drawback concerns the inflexibility of the system to adapt dynamically to the traffic requirements of the STs. Given the bursty nature of Internet traffic, traffic emanating from the STs can vary greatly, thereby making it technically impractical to adjust the static channel assignments of the traditional bent-pipe satellite systems.

Based on the foregoing, there is a clear need for improved approaches for transporting traffic over a satellite communications system.

There is also a need to enhance efficient utilization of the system capacity.

There is also a need to employ a flexible architecture that provides increased network functionalities.

There is a further need to dynamically adapt to bandwidth requirements of the satellite terminals.

Based on the need to improve system efficiency, an approach for providing an optimized bandwidth-on-demand (BoD) system is highly desirable.

SUMMARY OF THE INVENTION

According to one aspect of the invention, a method is provided for exchanging data in a communications system that includes a controller coupled to a switch. The method includes receiving a message requesting bandwidth from a processor. The method also includes selectively granting the bandwidth request by a bandwidth controller, and transmitting an assignment message that specifies a bandwidth allocation based upon the granting step to the processor. Further, the method includes initiating transmission of a control message to the controller to provide bandwidth allocation information concurrently with the transmitting step. Under this approach, the system capacity is efficiently utilized.

According to another aspect of the invention, a communications system for exchanging data is disclosed. A bandwidth controller is configured to receive a message requesting bandwidth from a remote processor and to selectively grant the bandwidth request. The bandwidth controller transmits an assignment message that specifies a bandwidth allocation to the remote processor and concurrently transmits a control message. A switch is configured to forward the assignment message to the remote processor. A controller is coupled to the switch and configured to receive the control message, wherein the control message provides bandwidth allocation. The above arrangement advantageously adapts dynamically to bandwidth requirements of the satellite terminals.

According to another aspect of the invention, a communications system that has a controller coupled to a switch includes means for receiving a message requesting bandwidth from a processor. The system also includes means for selectively granting the bandwidth request, and means for transmitting an assignment message that specifies a bandwidth allocation based upon the bandwidth request to the processor. The system further includes means for initiating transmission of a control message to the controller to provide bandwidth allocation information concurrently with the transmission of the assignment message. The above arrangement advantageously enhances system throughput.

According to another aspect of the invention, a satellite communications system that includes a satellite having a payload control computer is provided. A switch is coupled to the payload control computer and is configured to forward data from a terminal. The terminal is configured to transmit a message requesting bandwidth over a communication network that is separate from the satellite communications system A bandwidth control processor is located remotely from the payload control computer of the satellite and is configured to transmit an assignment message that selectively specifies a bandwidth allocation over the communication network to the terminal, and to concurrently initiate transmission of a control message to the satellite to provide bandwidth allocation information to the payload control computer. The above arrangement advantageously distributes bandwidth control functionalities to avoid processing delays.

In yet another aspect of the invention, a computer-readable medium carrying one or more sequences of one or more instructions for exchanging data in a communications system that includes a controller coupled to a switch is disclosed. The one or more sequences of one or more instructions include instructions which, when executed by one or more processors, cause the one or more processors to perform the step of receiving a message requesting bandwidth from a processor. Other steps include selectively granting the bandwidth request, and transmitting an assignment message that specifies a bandwidth allocation based upon the granting step to the processor. Another step includes initiating transmission of a control message to the controller to provide bandwidth allocation information concurrently with the transmitting step. This approach advantageously provides a flexible architecture for the transmission of data traffic.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1A and 1B are diagrams of a communication switching system with bandwidth control processing capability, according to an embodiment of the present invention, and an exemplary satellite communications system implementation, respectively;

FIGS. 2A and 2B are diagrams of the volume allocation operation, according to an embodiment of the present invention;

FIGS. 3A–3C are diagrams of the formats of a bandwidth request message, an allocation message, and an acknowledgement message, respectively, in accordance with an embodiment of the present invention;

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention accomplishes bandwidth-on-demand (BoD) with respect to high volume traffic originating from multiple satellite terminals (STs). A satellite communications system includes a satellite that has a switch and payload control computer. The switch, in conjunction with the payload control computer, processes traffic from the STs through the satellite. A satellite terminal transmits a bandwidth request message over a communication network that is separate from the satellite communications system. According to one embodiment of the present invention, the communication network is a terrestrial network. A bandwidth control processor (BCP) is located remotely, e.g., within a network operations control center (NOCC), from the payload control computer of the satellite. The BCP transmits an assignment message that selectively specifies a bandwidth allocation over the communication network to the terminal. The BCP concurrently initiates transmission of a control message to the satellite to provide bandwidth allocation information to the payload control computer (PCC). The PCC, in turn, adjusts either the appropriate counters or threshold values to reflect the allocation that was made by the BCP. This approach maximizes system capacity, in part, by utilizing bandwidth requests that accurately reflect the actual, real-time traffic of the STs.

Figure 1B:
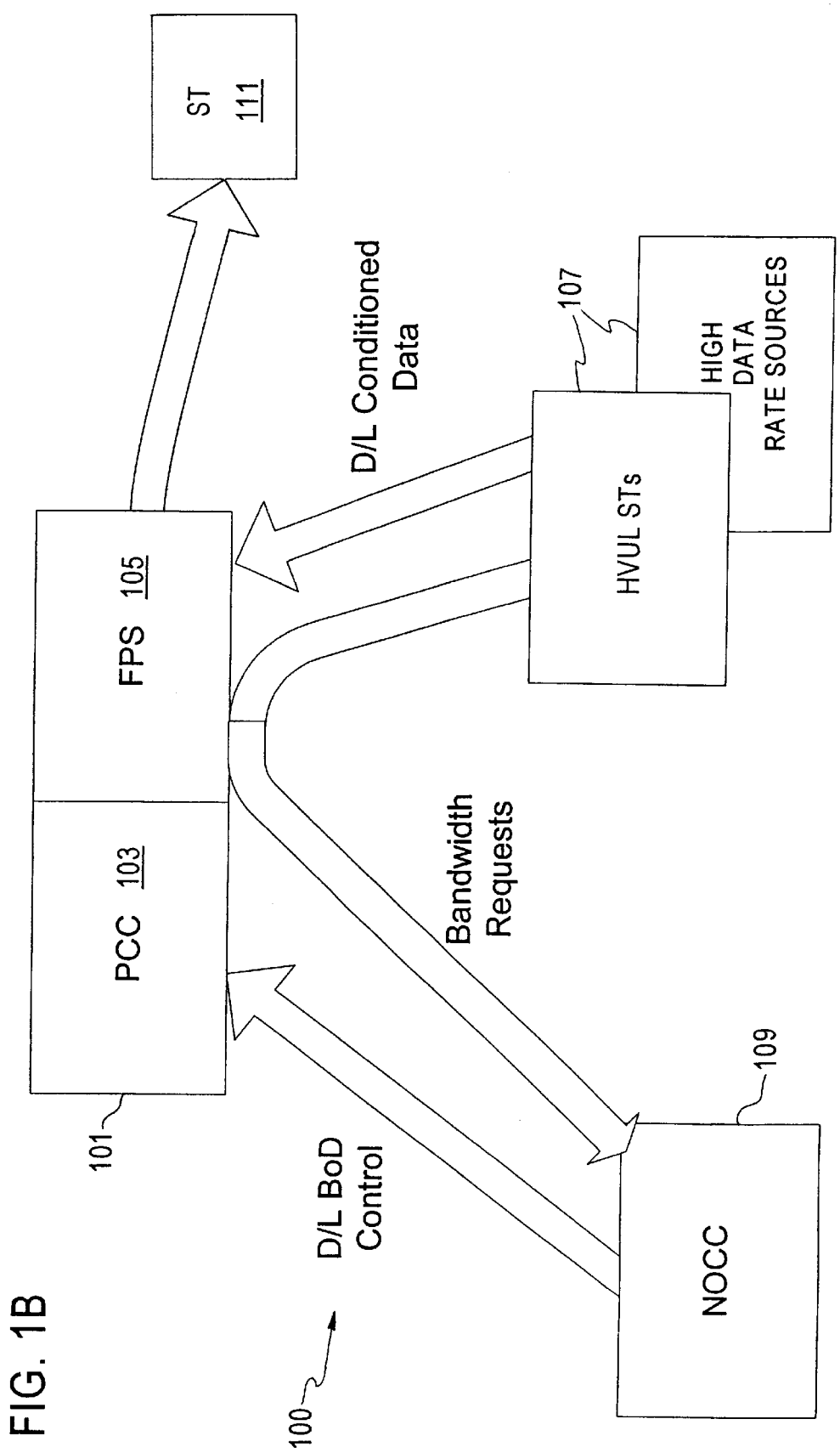

FIGS. 1A and 1B show a communication switching system with bandwidth control processing capability, according to an embodiment of the present invention, and an exemplary satellite communications system implementation, respectively. Communication system 150 supports bandwidth-on-demand (BoD) functionalities and includes a network 151 that permits the exchange of data between a bandwidth controller 153 and a remote processor 155. The bandwidth controller 153 and remote processor 155, in an exemplary embodiment, are general computers, as described in FIG. 8. As discussed below, bandwidth controller 153 may alternatively be a distributed computing system. Under this scenario, a data path 157 is established in part by a switch 159, which may be any type of communication switch. Exemplary switches include an ATM (Asynchronous Transfer Mode) switch, and a Gigabit Ethernet switch; however, it is recognized by one of ordinary skill in the art that any equivalent switch, whether frame based or cell based, can be utilized. Processor 155 makes a bandwidth request to the bandwidth controller 153, which in turn, generates an assignment message that specifies the amount of system bandwidth allocated to the requesting processor 155. This assignment message is forwarded through network 151 to the requesting processor 155. Concurrently, the bandwidth controller 153 transmits a control message that contains bandwidth allocation information (e.g., bandwidth threshold values) to a controller 161, which communicates with the switch 159 and processes information regarding bandwidth allocation from the bandwidth controller 153. According to one embodiment of the present invention, controller 161 is a processor that is separate from switch 159; however, in an alternative embodiment, the controller 161 may be a process or software that is integrated with switch 159. Upon receiving the control message, the controller 161 instructs the switch 159 accordingly to adjust bandwidth capacity assignments to account for the bandwidth to be consumed by processor 155. Details of the bandwidth allocation process are more fully described with respect to an exemplary satellite communications system in FIGS. 4–7.

In the example shown in FIG. 1A, data path 157 exhibits a long delay, such that data transmission time between bandwidth controller 153 and remote host 155 is in the order of milliseconds. The long delay of data path 157 is characteristic, for example, of a satellite system or a terrestrial modem system. The above bandwidth allocation process is particularly well-suited to systems exhibiting relatively long delay in one or more data paths.

FIG. 1B shows a block diagram of a satellite communications system with bandwidth control processing performed within a PCC of a satellite. A satellite communications system 100 employs a satellite 101, which contains a PCC 103 in communication with a fast packet switch (FPS) 105 (e.g., an ATM switch, a Gigabit Ethernet switch, and etc.) The FPS 105 transfers the packets that the payload of the satellite 101 receives on the uplinks to the proper downlinks. The payloads of satellite 101, in addition to the PCC 103 and the FPS 105, include other components, such as an uplink antenna, down-converters, switch matrix, demodulator banks, and phased-array downlink antenna; these other components are well-known, and thus, are not described in detail.

Satellite 101 communicates with multiple satellite terminals (STs) 107 and 111. In this exemplary embodiment, the STs 107 are high volume uplink (HVUL) terminals; that is, these HVUL terminals 107 handle a large amount of traffic from user nodes (not shown). To transmit traffic that is forwarded by user nodes (not shown) to non-HVUL STs 111, the HVUL STs 107 are required to submit bandwidth request messages to the satellite 101. These HVUL STs 107 are characterized by the fact that they receive large volumes of connectionless traffic, which trigger an enormous number of bandwidth requests to the PCC 103. As will be more fully discussed later, the PCC 103 performs the necessary bandwidth control functions, in conjunction with the network operations control center (NOCC) 109, which may include multiple computing platforms.

In system 100, HVUL STs 107 originate traffic (i.e., data) from a particular coverage area. The generated traffic from these STs 107 are transferred through switch 105 and terminate at destination STs (not shown) within the same and/or different coverage area. That is, the destination STs can be within the same coverage area as the originating HVUL STs 107. To effectively transmit traffic to the desired destination ST through switch 105, HVUL STs 107 transmit bandwidth requests to the PCC 103 prior to transmitting any data traffic.

A connection that is established between an HVUL ST 107 and a destination ST (not shown) is controlled by the PCC 103 and the NOCC 109. The NOCC 109, which is based on the ground, provides management functions for the system 100. For example, an ST 107 needs to obtain authorization from the NOCC 109 before making a request to the PCC 103. The NOCC 109 keeps track of the total uplink (and downlink) bandwidth available for connections and will block a connection request if there is insufficient satellite capacity available to satisfy the request. As more fully described in FIG. 4, in an alternative embodiment, the functionalities of the PCC 103 can also be duplicated in a processor within the NOCC 109, so that the PCC 103 does not become inundated with bandwidth requests from the HVUL STs 107.

The PCC 103 implements the bandwidth control function that includes controlling the allocation of uplink channels and timeslots and mitigating downlink congestion. PCC 103 examines the requested bandwidth and replies with grants based on downlink resource availability, as determined by a congestion avoidance logic (not shown) and uplink resource availability. The congestion avoidance logic regulates the amount of traffic received by the switch 105 through TDMA (Time Division Multiple Access)/FDMA (Frequency Division Multiple Access) uplink channels via request/grant bandwidth control processes. To better appreciate the present invention, it is instructive to discuss the system capacity of the satellite system 100.

According to one embodiment of the present invention, two types of requests are defined: rate requests, and volume requests. In general, rate requests are utilized for connection-oriented traffic, while volume requests are used to transmit bursty traffic. The present invention has particular application to volume requests. Although FIG. 1B shows that the STs 107 are HVUL type STs, it is understood that STs 107, in general, can submit rate requests as well as volume requests, depending on the mode of operation (i.e., the type of traffic the ST is processing at a given time). Rate requests specify the number of slots in each uplink frame that an ST 107 needs to meet the uplink demands for a relatively constant traffic (e.g., connection-oriented). A rate request results in the allocation of a constant number of slots each frame, spread out as evenly in time as possible, which the ST 107 can use to send packets at a constant rate. In an exemplary embodiment, each frame has 32 slots; a rate request specifies from 1 to 32 slots per frame. According to this example, the following service rates are provided by system 100: 16 Mbps (Megabits per second), 8 Mbps, 2 Mbps, 1 Mbps, 512 Kbps (Kilobits per second), and 256 Kbps; however, it is recognized that any rate may be provided, depending on the system capacity of the satellite communication system 100. A full 16 Mbps, 2 Mbps, or 512 Kbps user requests all 32 slots, a 8 Mbps, 1 Mbps, or 256 Kbps ST requests 16 slots, etc., per frame. The requesting ST 107 gets a constant allocation of that uplink capacity every frame until the request is cancelled by the ST 107 via a de-allocation message to the satellite.

HVUL STs 107, as previously indicated, process connectionless traffic, and thus, mainly issue volume requests. Volume requests specify the number of uplink slots that an ST 107 requires to send a specific number of packets to another ST 107. The requesting ST 107 receives a periodic allocation of one or many slots within a specific frame until the entire number of slots requested has been allocated. Volume requests are used by the ST 107 to send a burst (one or many) of data packets on the uplink. Several volume requests may be transmitted by the ST 107 in a short period of time to send a file that has hundreds of data packets (e.g., segmented IP (Internet Protocol) packets) to another ST 107.

The bandwidth request operation is performed by an ST 107 that transmits data using a rate request during one session and a volume request during another session. A satellite terminal (ST) transmits a bandwidth request message to the satellite over a contention channel. Based on the current traffic load, the PCC 103 may dynamically assign some of the 512 Kbps uplink channels on a frame-by-frame basis to change the designation of these uplink channels from data channels to contention channels. Thus, when the traffic on the 512 Kbps data channels is light, the PCC 103 can assign most of the 512 Kbps data channels to be used as contention channels, thereby reducing the collision rate for contention accesses by the STs 107. In other words, as traffic on data channels increases, the PCC 103 can change contention channels into data channels, as appropriate. This advantageously permits a more efficient use of satellite capacity, in that as the load increases, fewer channels are dedicated to receiving new bandwidth request messages.

Upon receiving the bandwidth request message and after determining that bandwidth is available, the satellite 101 sends a rate allocation every frame to provide the ST 107 with a fixed number of time slots that the ST 107 can transmit into that frame. Specifically, the PCC 103 allocates uplink slots in response to bandwidth requests from STs 107 in each uplink beam once every 96 ms frame and sends rate allocations to the STs 107 in these downlink cells once per frame using allocation messages. Sending rate allocations every frame allows the PCC 103 to move rate allocation slots within a channel or to another channel to "defragment" the rate allocations.

As indicated previously, according to one embodiment, the PCC 103 packs allocations for several STs 107 into each allocation message to preserve downlink bandwidth. The PCC 103 addresses allocation messages to a dedicated multicast group address so that these packets can be processed by all of the STs 107 in the downlink cell that are waiting for slot allocations. These STs 107 process every allocation message that they receive to find the ones that contain their own destination addresses and their corresponding allocations.

Rate requests, according to an embodiment of the present invention, are acknowledged by the PCC 103 in one of two ways, rate allocation within an allocation message or rate denied within an acknowledgement message. As used herein, the term assignment messages refer generally to both allocation messages and acknowledgement messages; acknowledgement messages, as will be described with respect to FIG. 3C, effectively is a denial of the request (i.e., no slots have been allocated). If an ST 107 receives a request denied response to a rate request, the ST 107 notifies the NOCC 109, which then determines the course of action. Rate requests are de-allocated (released) by the ST 107 when the ST 107 has completed its transmission. Rate de-allocated messages from the ST 107 are not acknowledged by the PCC 103. The ST 107 monitors the multicast allocation message from the PCC 103 to determine that the rate was de-allocated. The NOCC 109 can also de-allocate a rate request for an ST 107.

The size of rate requests can be increased or decreased by sending a rate change request specifying a different number of slots per frame. The change request is sent using an allocation from the original rate request. If the rate change is granted, the ST 107 receives an allocation for the new rate within a multicast allocation message. If the rate change is denied, the ST 107 receives a multicast acknowledgement message indicating the denial. The PCC 103 does not de-allocate the original rate request until the PCC 103 has successfully processed and allocated the changed rate request.

An ST 107 that does not receive a multicast packet with its allocation (due to a rain fade, etc.) cannot transmit. The ST 107 must wait until a multicast is received that specifies the allocation to resume transmission.

Successive rate allocations provide the ST 107 with the same number of time slots in a frame; however, the channel and slot locations for that allocation may be changed. Upon receiving the rate allocation, the ST 107 can begin transmitting data. Thus, an ST 107 may send a packet burst into a timeslot on a data channel only if the ST 107 has sent a request message to the PCC 103 and has received an allocation from the PCC 103 authorizing the ST 107 use of specific timeslots on a particular channel. It should be noted that the data channels experience no collisions because the PCC 103 only allocates a timeslot on a data channels to a single ST 107. The rate allocation remains until the ST 107 sends a bandwidth release packet. Initial bandwidth requests for a rate allocation are typically sent on a contention channel. However, the release packet, which de-allocates a rate, can be sent within the rate allocation that is being de-allocated.

The same ST 107 can also initiate a volume request during another session. Original volume requests are sent to the PCC 103 via a contention channel; alternatively, these requests may be "piggybacked" and sent using an allocation reserved for the ST 107 (such as an unused rate slot). Acknowledgements to bandwidth requests are used to ensure that requesting ST 107 receive a timely response to reduce the number of re-requests on contention channels. In response to a volume request made on a contention channel the PCC 103 sends either an acknowledgement or allocation to the requesting ST 107 in a multicast acknowledgement or allocation message. If the ST 107 times out, the ST 107 assumes a collision has occurred on the contention channel and sends another request. Upon receiving the allocation, the ST 107 begins transmitting data. If the ST 107 has additional data to send, follow-up volume requests are sent to the PCC 103 using an allocation from the original or previous follow-up request. Follow-up requests are not acknowledged by the PCC 103.

As evident from the above discussion, an ST 107 can use volume requests to send large amounts of data on the uplink and, by the use of "follow-up" requests, almost continuously send data for a long period of time. For example, the ST 107 can initiate an original volume request for uplink bandwidth by sending a message on the uplink on a contention channel for a number of slots required to transmit data packets. If the ST 107 receives additional data for the same data stream before the initial request has been completely metered out, a follow-up volume request can be made by sending an in-band message using a slot allocation of the previous request. The follow-up request is for the number of slots required for data packets for which a request has not been made (including the packet for the data displaced by the follow-up). The maximum number of slots allowed to be requested in a single volume request is configurable by a NOCC 109 (FIG. 5) (e.g., 1600 slots).

On the downlink of communication system 100, at each TDMA transmission slot, a downlink scheduler (not shown) within satellite 101 selects up to n bursts of packets from M virtual queues (shown in FIG. 5) of a packet buffer (not shown) within the payload of satellite 101 to transmit through n transmitters, based on the scheduling algorithm and transmission constraint checks. The scheduling algorithm, in an exemplary embodiment, is a round-robin scheme. Because the downlink scheduler (not shown) may not be able to find n bursts to transmit most of the time due to transmission constraints, downlink transmission capacity is greatly limited by transmission constraints. The downlink congestion in communication system 100 occurs when the amount of traffic admitted to the switch 105 exceeds the capacity of the downlink. In other words, if the PCC 103 made uplink allocations simply based on the availability of uplink slots, the PCC 103 would sometimes admit more traffic to a particular downlink cell (i.e., destination site) or cluster of mutually-interfering microcells than the downlink can carry. Consequently, the data packets for these areas would completely fill the packet buffer 307 in the payload's switch 105, resulting in dropped packets. Therefore, the availability of both uplink slots and downlink bandwidth factor into bandwidth allocations that is performed by the PCC 103.

FIGS. 2A and 2B shows examples of volume allocations from the PCC 103. A volume allocation gives an ST 107 permission to transmit into specified timeslots on a specified channel. STs request volume allocations when they have a specific number of data packets that the STs 107 seek to deliver for connectionless packet delivery service. Diagram 201 shows that the ST 107 has been allocated 13 bursts in contiguous timeslots on a specified channel. The allocations straddle an uplink frame boundary 203. If this is a 512 Kbps channel allocation, the ST 107 will be able to send 13 bursts containing a total of 26 data packets. With respect to diagram 205 of FIG. 2B, the ST 107 has been allocated timeslots in three consecutive frames. There is a rate allocation (shown in white) to another ST 107 on this channel, so the volume allocation (shown in black) is interspersed with the rate allocation over multiple frames.

FIGS. 3A–3C show a bandwidth request message, an allocation message, and an acknowledgement message, respectively, in accordance with an embodiment of the present invention. As in FIG. 3A, a request message 300 includes the following fields: a destination address field 301; an uplink rate field 303; a request type field 305; a rate request field 307; a destination downlink field 309; and a request priority field 311. The destination address field 301 specifies the requesting ST's destination address. The uplink rate field 303 indicates the uplink rate; e.g., 128 Kbps, 512 Kbps, 2 Mbps, or 16 Mbps. The request type field 305 indicates whether the request is a rate or volume allocation. The rate request field 307 permits the ST 107 to specify the requested rate or number of time slots requested. The destination downlink field 309 specifies the downlink cell where the packets in the requested slots are to be sent. The request priority field 311 allows the ST 107 to indicate whether the request is a low or high priority. The satellite processes low priority requests, for example, only if there are slots remaining after all high priority requests have been filled.

As seen in FIG. 3B, the allocation message 320 contains individual rate and volume allocations with the following information: an ST 107 source address field 321, a rate/number of slots field 323, and a last allocation of request field 325 (meaningful for volume requests only). The address field 321 stores the address of the requesting ST. The rate/number of slots field 323 indicates the requested rate (i.e., number of slots in the frame for a given channel). The field 325 pertains only to volume requests, and specifies whether this is the last allocation.

The acknowledgement message 340, as in FIG. 3C, contains individual acknowledgements or denials with the following fields: an ST source address field 341, a request ID 343, and a type field 345. The ST source address field 341 is the same as field 321 of the allocation message. The request ID (identification) field 343 indicates a particular request for the ST, so that in a volume request, the potentially numerous follow-up requests can be properly managed. The type field 345 specifies that the PCC 103 is denying the request.

Figure 4:
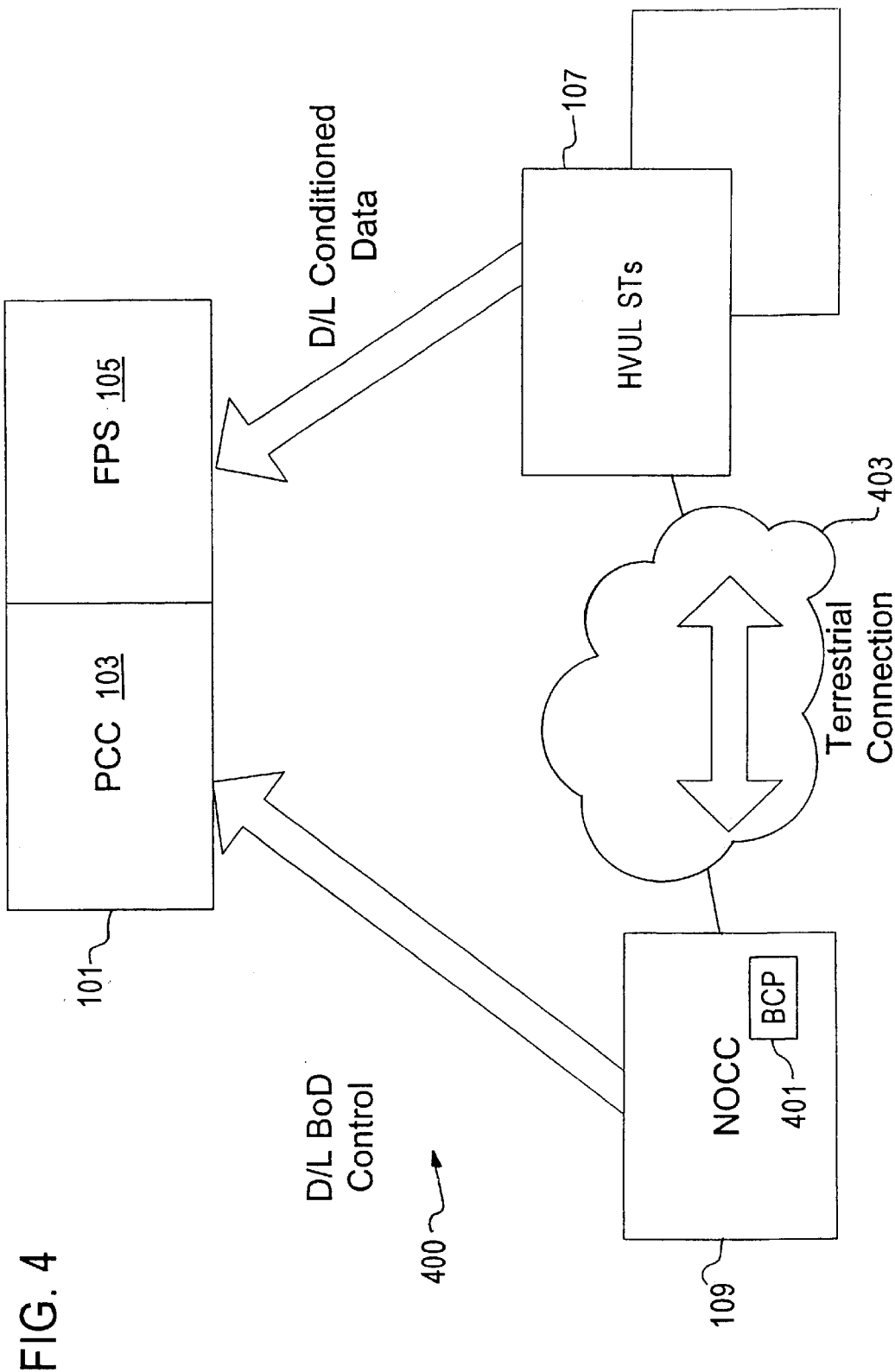
FIG. 4 is a diagram of a satellite communications system with bandwidth control processing performed by a bandwidth control processor resident within a network operation control center (NOCC), according to an embodiment of the present invention.

FIG. 4 shows a diagram of a satellite communications system with bandwidth control processing performed by a bandwidth control processor (BCP) resident within a network operation control center (NOCC), according to an embodiment of the present invention. As shown, a satellite communications system 400 includes HVUL STs 107, a satellite 101, and a NOCC 109, as in the system of FIG. 1B. However, in this embodiment, the NOCC 109 has a bandwidth control processor (BCP) 401, which shares the processing of bandwidth requests with the PCC 103. As indicated previously, the multiple HVUL STs 107, because of the enormous amount of traffic, may overwhelm the PCC 103 with too many bandwidth request messages, thereby causing congestion of the PCC 103.

In addition, system 400 utilizes a terrestrial communication network 403 to provide connectivity between the HVUL STs 107 and the NOCC 109. The terrestrial network 403 may be any number of high speed networks; for example, ATM, Gigabit Ethernet, FDDI (Fiber Distributed Data Interface), or a router-based network. Further, the network 403 may be a wide-area-network (WAN) or a metropolitan-area-network (MAN). User traffic is received by the HVUL STs 107 from numerous end user nodes (not shown), where it is stored and processed (e.g., segmentation of IP (Internet Protocol) frames). The amount of traffic that enters the HVUL STs 107 can cause a message flood in the PCC 103, negatively impacting the performance of the entire system 400. Accordingly, the present invention distributes the bandwidth control function to a remote processor (i.e., bandwidth control processor 401) within the NOCC 109 in addition to the PCC 103.

Unlike the system of FIG. 1B, the HVUL STs 107 make bandwidth-on-demand (BoD) requests to the BCP 401 within the NOCC 109 instead of the PCC 103. It should be noted that non-HVUL STs (not shown) make requests directly to the PCC 103. As will be more fully described later, in turn, the BCP 401 selectively issues BoD grants that specify an uplink assignment, if it is determined that both uplink and downlink bandwidths are available. In particular, upon receipt of bandwidth requests from an HVUL ST 107, the BCP 401 sends an assignment messages back to the requesting HVUL ST 107 indicating the bandwidth assignment. According to one embodiment of the present invention, the bandwidth requests and the associated assignment message are sent over the communication network 403. Alternatively, these messages can be exchanged via the satellite 101, instead of the terrestrial network 403, assuming the HVUL ST 107 can tolerate the additional propagation delay. Concurrent with the transmission of the assignment message to the requesting HVUL ST 107, the BCP 401 generates a control message, which contains bandwidth allocation information, and forwards this control message to the PCC 103. As a result, the PCC 103 is notified that HVUL ST 107 is transmitting an amount of traffic that is specified in the bandwidth allocation information. The bandwidth allocation information, according to an exemplary embodiment, may be a counter offset value or a threshold offset value; these parameters effectively enable the PCC 103 to adjust the capacity assignments to account for the allocation to HVUL ST 107.

The traffic from HVUL ST 107 is queued in the switch 105 for transmission via a downlink to the microcell that contains the destination ST. The switch 105 within the satellite 101 supports a packet drop priority scheme, in which the PCC 103 implements drop thresholds, which limit the number of packets entering the queues of switch 105. In an exemplary embodiment, four drop priorities are implemented to determine the order in which packets will be dropped during congestion. Priority 0 is assigned to the highest priority traffic and would be the last type of packets to be dropped. Priority 3 is assigned to the lowest priority traffic and would be the first type of packets to be dropped. Before uplink transmission, the HVUL ST 107 marks packets as one of these four drop priorities.

The queues of switch 105, which in an exemplary embodiment are logical, correspond to the microcells; the queues store traffic on a burst basis (e.g., in groups of 12 packets). In an exemplary embodiment, for each one of the queues, a pair of thresholds (i.e., a drop maximum ("drop max") and a drop minimum ("drop min")), which correspond to each of the four priorities, restrict the number of packets that are stored in the queues. When the number of bursts in a queue exceeds the drop max threshold for a given priority, the packets in the priority are dropped as they are demodulated from the uplink. Packets continue to be dropped until the traffic falls below the drop min threshold. If congestion persists, packets are dropped based upon the associated thresholds of the other priorities.

For volume traffic, the NOCC 109 determines a threshold for each microcell that the PCC 103 and the BCP 401 should not exceed in granting BoD requests for that destination during a bandwidth allocation period (96 msec.). These thresholds are set to minimize packet dropping, while not under utilizing available bandwidth. For each bandwidth allocation period, a BoD request for a microcell may be reduced or denied if making the grant with the others already granted would cause the traffic to exceed the threshold specified for the cell. It is noted that at the start of the bandwidth allocation period, pre-existing rate grants are immediately subtracted from the thresholds, with only the remainder being available for volume traffic.

Figure 5:
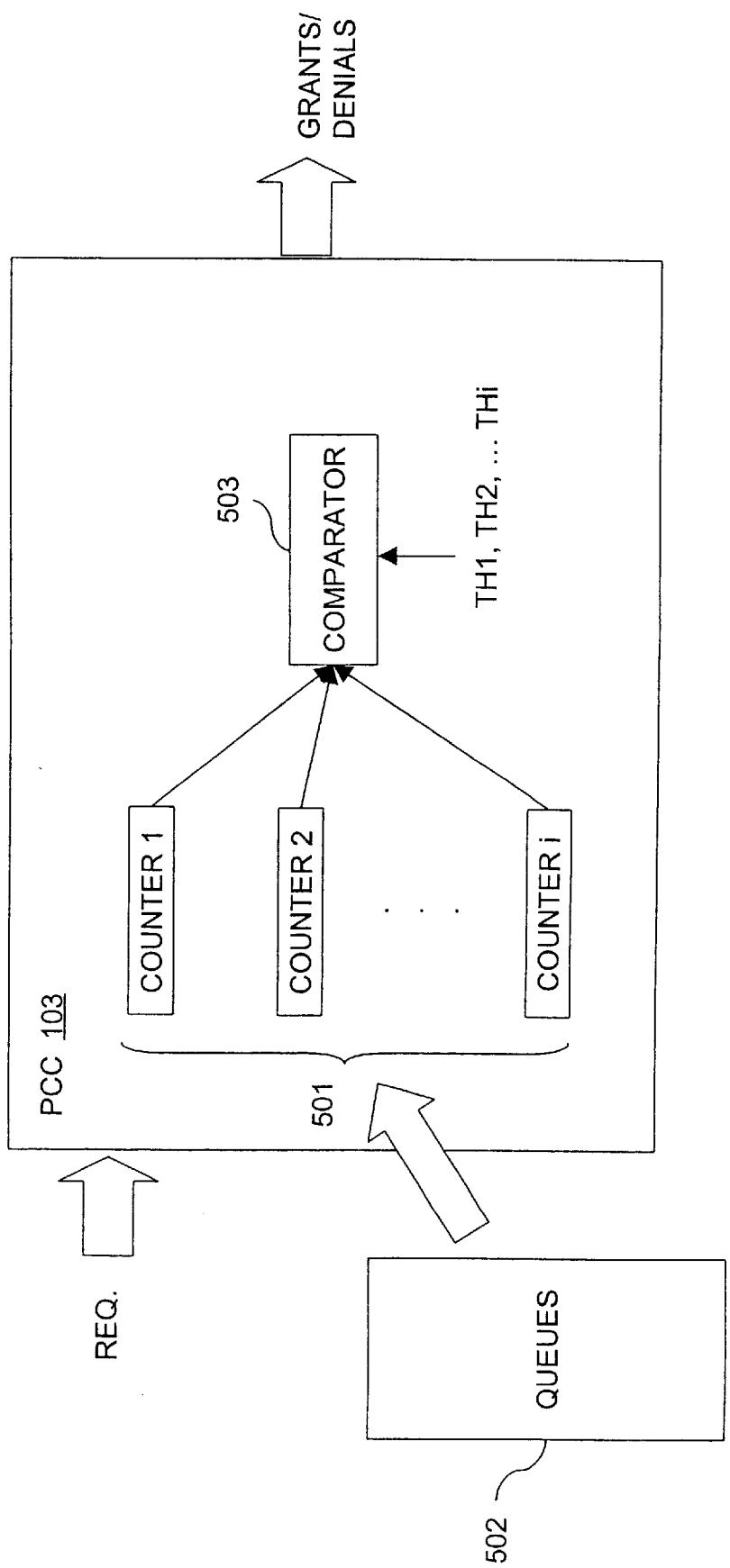
FIG. 5 is a diagram of the payload control computer (PCC), according to an embodiment of the present invention.

FIG. 5 shows a diagram of the payload control computer (PCC) in the system of FIG. 4. To manage the thresholds of the queues 502 of the switch 105, the PCC 103 maintains a set of counters 501 that correspond to these queues 502. The values of the counters 501 are compared with their respective threshold values ($TH_1$, $TH_2$, ..., $TH_j$) by a comparator 503 to determine whether bandwidth assignments can be made to the requesting HVUL ST 107.

By way of example, assuming an HVUL ST 107 has traffic that is destined for a destination ST (not shown), the HVUL ST 107 transmits a bandwidth request to the BCP 401. In turn, the BCP 401 instructs the PCC 103 via the associated control message to increment an appropriate counter, for example Counter 1, corresponding to the microcell to which the destination ST is a part of. Counter 1 is incremented based upon the received request. From an implementation perspective, the control message conveys either a counter offset value or a threshold offset value. As previously mentioned, these offset values are a mechanism for notifying the PCC 103 that a certain amount of the available bandwidth has been allocated for the traffic from HVUL ST 107. Upon receipt of the a control message that contains a counter offset value corresponding to Counter 1, the PCC 103 adjusts the value of Counter 1 by incrementing Counter 1 to a value that reflects the allocation that is made by BCP 401 to HVUL ST 107.

Alternatively, the NOCC 109 can transmit a control message that contains a threshold offset value. The threshold offset value reflects the bandwidth allocation by the amount of decrease in the threshold value. When the control message is received, the PCC 103 adjusts the appropriate threshold values downward by the amount specified in the control message.

It should be noted that Counter 1 also stores non-HVUL traffic; that is, traffic not originating from the HVUL STs 107. The non-HVUL bandwidth requests also affect the counters values. For instance, if a non-HVUL ST seeks to transmit to the microcell corresponding to Counter 1, the non-HVUL request causes an adjustment of the value of Counter 1 according to the bandwidth assignment. The comparator 503 compares the value of Counter 1 against a respective threshold value, $TH_1$. If the value of Counter 1 is less the threshold $TH_1$, then the PCC 103 grants the non-HVUL request; otherwise, the PCC 103 cannot honor this request. The management of the counter values and the threshold values performed by the PCC 103 as well as the BCP 401 within the NOCC 109.

When the BCP 401 performs bandwidth allocations in response to a request from a HVUL ST 107, the BCP 401 conveys the exact assignment to the PCC 103 in form of a control message. This capability advantageously permits the dynamic allocation of bandwidth for traffic entering the HVUL ST 107, in that the request reflects the actual traffic. The bandwidth requests can specify traffic requested per downlink cell. Furthermore, these requests can indicate the traffic requested per cluster.

Figure 6:
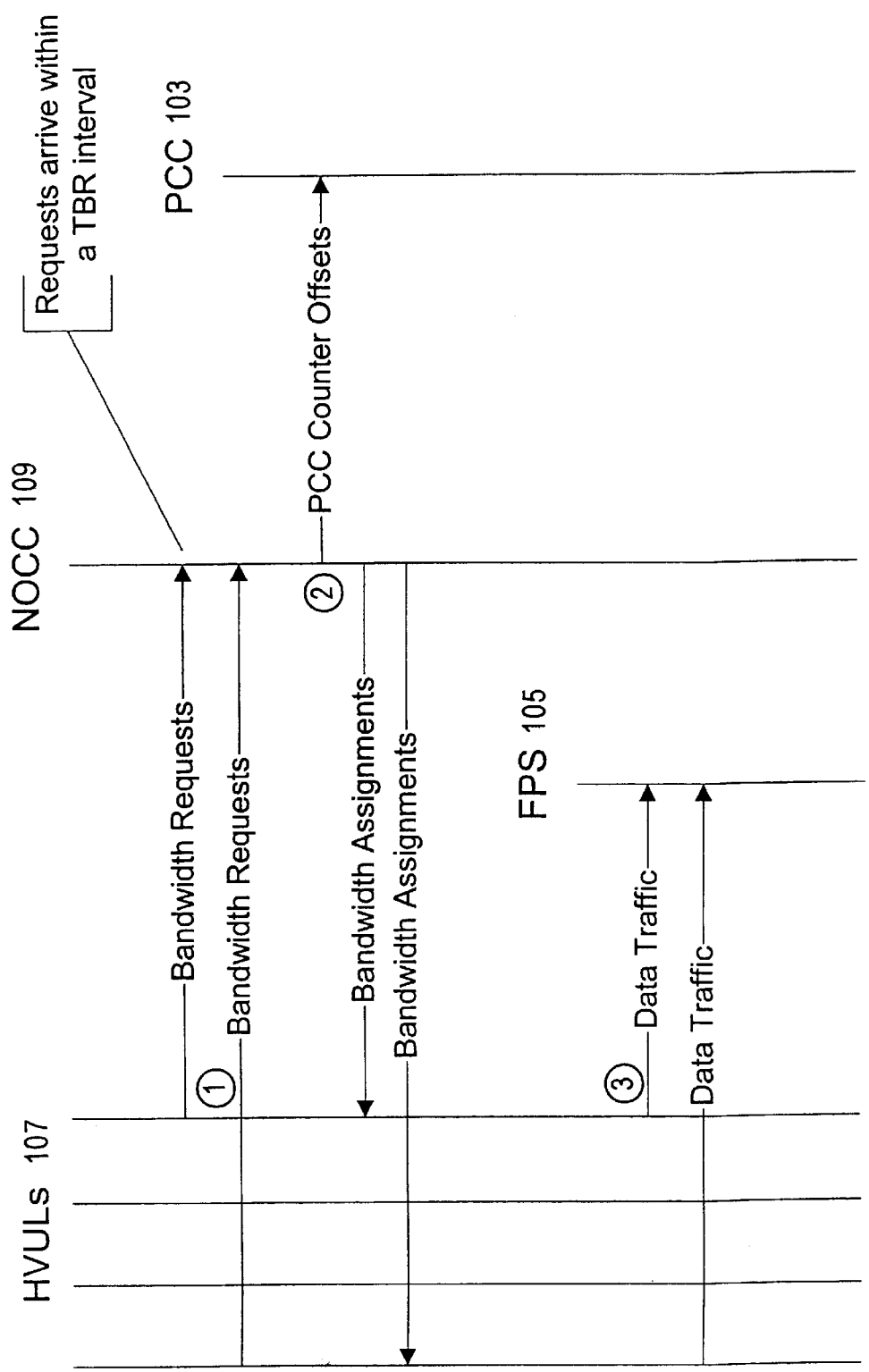
FIG. 6 is a diagram of the data flows associated with the process of bandwidth allocation to High Volume Uplink (HVUL) satellite terminals (STs), in accordance with an embodiment of the present invention.

FIG. 6 shows a diagram of the data flows associated with the process of bandwidth allocation to HVUL terminals, in accordance with an embodiment of the present invention. HVUL STs 107 receive traffic from end user nodes (not shown), and in turn, issue bandwidth requests to the NOCC 109 over a terrestrial connection (i.e., network 403), per step 1. The NOCC 109, as in step 2, makes the necessary bandwidth allocations by sending assignment messages, which specify the bandwidth assignments, back to the requesting HVUL STs 107. At this time, the NOCC 109 also transmits a control message to the PCC 103 within satellite 101. In this example, the control message contains the counter offset values. As discussed previously, the control message may alternatively specify the threshold offset values. Next, the HVUL STs 107, as in step 3, can begin transmitting traffic to the fast packet switch 105 of satellite 101. The coordination and timing of the requests from the HVUL STs 107 to the PCC 103 and the NOCC 109 (i.e., BCP 401) and associated allocations are explained in FIG. 7.

Figure 7:
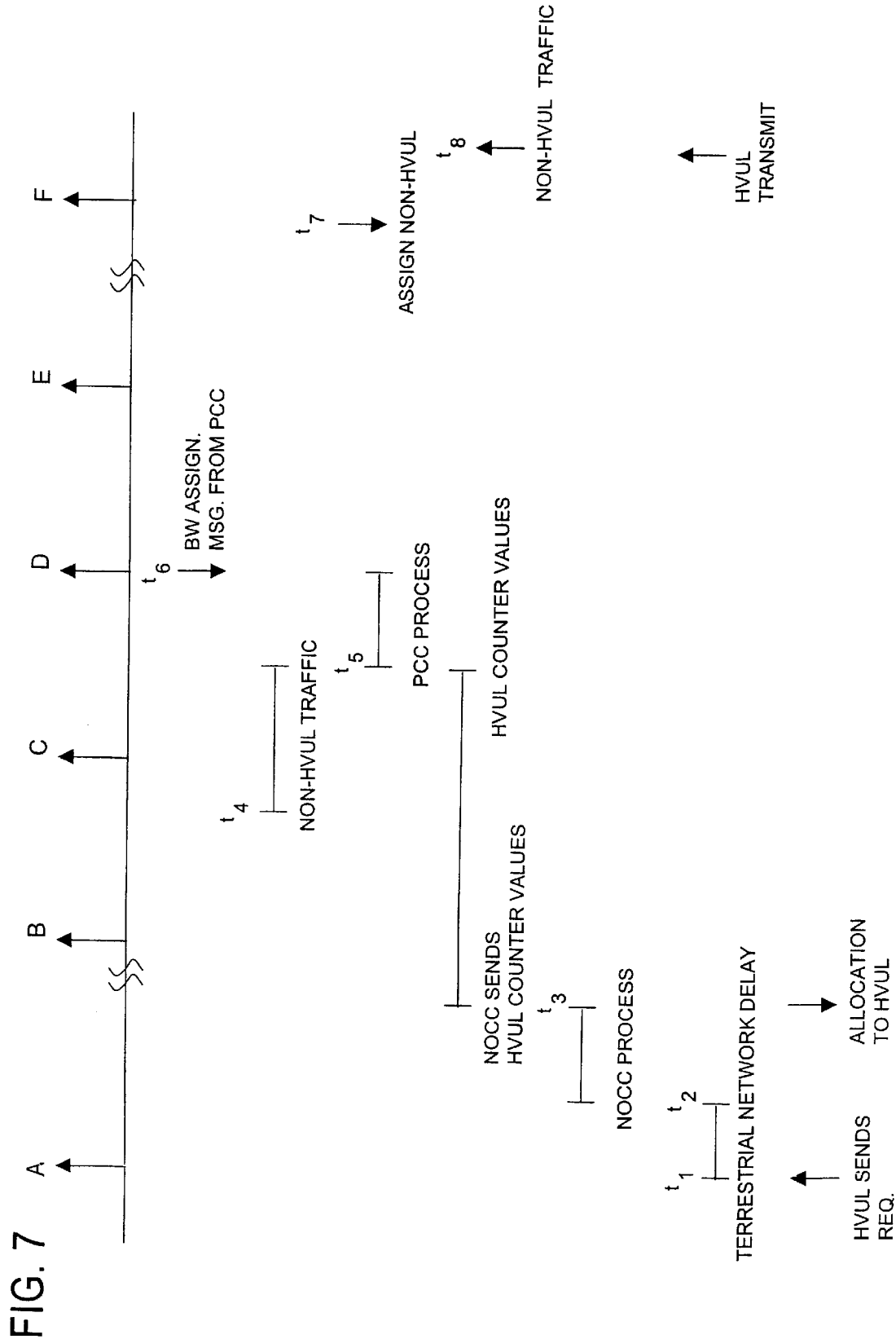
FIG. 7 is a timing diagram of the bandwidth allocation process for HVUL and non-HVUL traffic, in accordance with an embodiment of the present invention.

FIG. 7 shows a timing diagram of the bandwidth allocation process for non-HVUL and HVUL traffic, in accordance with an embodiment of the present invention. As discussed above, allocations are made once every 96 ms frame. It is important that the PCC 103 receives the bandwidth assignment information from the BCP 401 in time to perform the allocations to the HVUL STs 107. The vertical arrows (A–F) on time line 700 represent the start of each frame. For the purposes of explanation, an HVUL ST 107 sends a bandwidth request over the network 403 (FIG. 4) at the start of frame A (or time, $t_1$). The request requires a certain duration to reach the BCP 401 of NOCC 109; this delay is the difference between $t_1$ and $t_2$. Upon receipt of the bandwidth requests, the BCP 401 processes the requests during time $t_2$ to $t_3$. At $t_3$ the NOCC 109 transmits an acknowledgment message that specifies the bandwidth assignments to the HVUL STs 107. In addition, at $t_3$ the NOCC 109 sends a corresponding control message to the PCC 103. The control message reaches the PCC 103 after about 125 ms, which represents the propagation delay to the satellite 101, at time $t_5$.

While the control message is in transit, the PCC 103 also receives non-HVUL requests at time $t_4$ up through $t_5$ from non-HVUL STs. Next, the PCC 103 processes the non-HVUL requests as well as the information that is contained in the control message. In particular, the control message specifies the counter offset values. Accordingly, the PCC 103 adjusts the appropriate counters to reflect the assignments that have been made by the BCP 401 and the non-HVUL requests. At time $t_6$, the PCC 103 transmits the bandwidth assignments in an assignment message to the non-HVUL STs. Subsequently, at time $t_7$, the assignment message is received by the non-HVUL STs. At $t_8$, the non-HVUL STs and the HVUL STs 107 begin transmitting traffic to the satellite 101. The above approach advantageously provides an efficient use of system capacity by utilizing information that captures the actual traffic that is to be transported over the satellite communications system 100. In this manner, only a minimal reserved capacity is needed to accommodate imprecise forecasting of traffic.

If latency, however, is a greater concern than capacity, a predictive traffic scheme can be used at the HVUL STs 107 so that system processing time can be reduced. Under a predictive traffic scheme, a prediction of the traffic is made by examining the past traffic period over a prediction time interval. It is usually the case that the longer the prediction time interval is, the more accurate the prediction of the traffic.

It is noted that a number of frame periods (frame A to frame F) lapse from the time the HVUL STs 107 submits a request to the time traffic is transmitted. Thus, the system latency is the time difference between $t_1$ and $t_8$. This latency can be reduced by decreasing the prediction time for the traffic.

Figure 8:
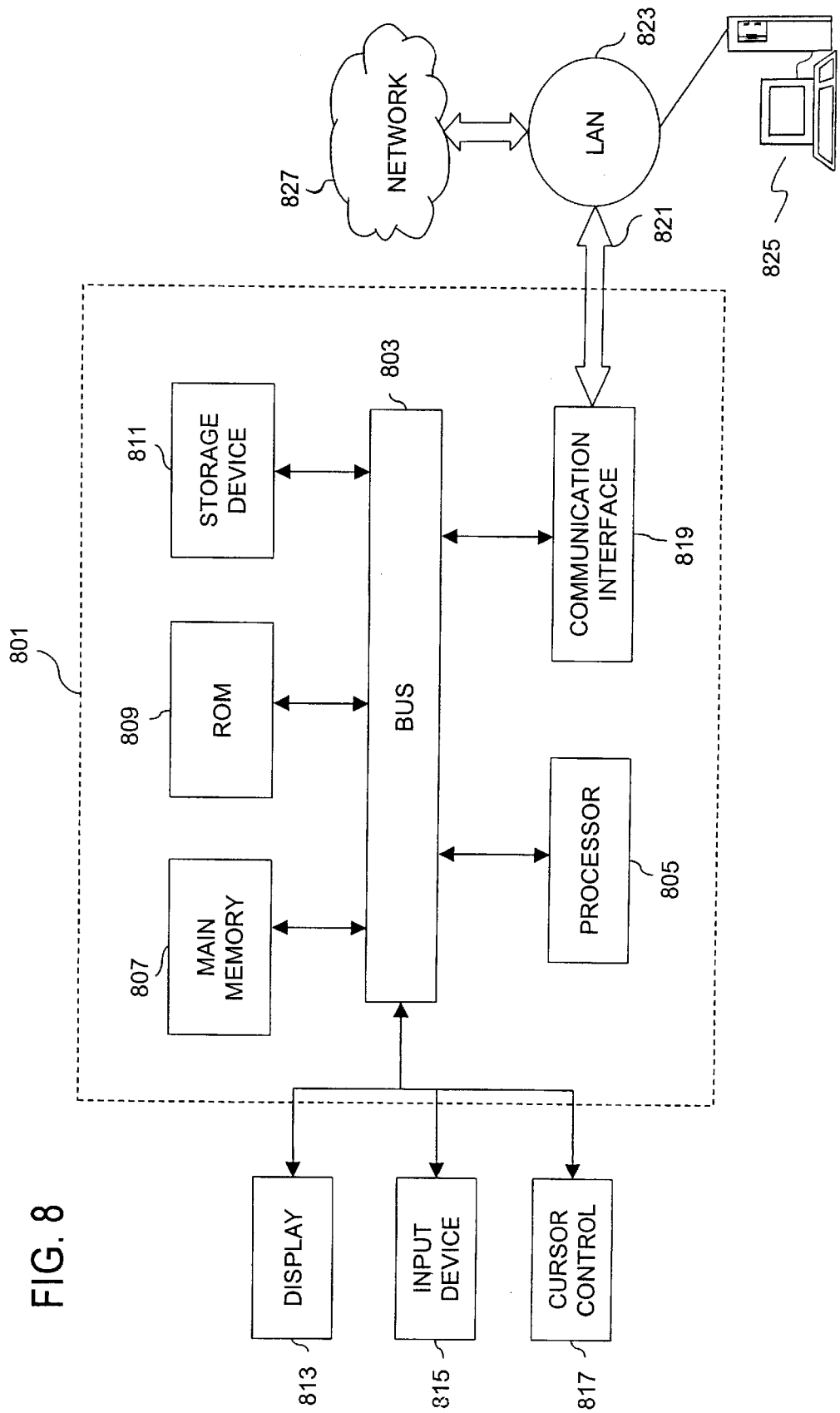
FIG. 8 is a diagram of a computer system that can perform the bandwidth control functions, in accordance with an embodiment of the present invention.

FIG. 8 illustrates a computer system 801 upon which an embodiment according to the present invention may be implemented to perform bandwidth allocation. Computer system 801 includes a bus 803 or other communication mechanism for communicating information, and a processor 805 coupled with bus 803 for processing the information. Computer system 801 also includes a main memory 807, such as a random access memory (RAM) or other dynamic storage device, coupled to bus 803 for storing information and instructions to be executed by processor 805. In addition, main memory 807 may be used for storing temporary variables or other intermediate information during execution of instructions to be executed by processor 805. Computer system 801 further includes a read only memory (ROM) 809 or other static storage device coupled to bus 803 for storing static information and instructions for processor 805. A storage device 811, such as a magnetic disk or optical disk, is provided and coupled to bus 803 for storing information and instructions.

Computer system 801 may be coupled via bus 803 to a display 813, such as a cathode ray tube (CRT), for displaying information to a computer user. An input device 815, including alphanumeric and other keys, is coupled to bus 803 for communicating information and command selections to processor 805. Another type of user input device is cursor control 817, such as a mouse, a trackball, or cursor direction keys for communicating direction information and command selections to processor 805 and for controlling cursor movement on display 813.

According to one embodiment, the processing of bandwidth requests is provided by computer system 801 in response to processor 805 executing one or more sequences of one or more instructions contained in main memory 807. Such instructions may be read into main memory 807 from another computer-readable medium, such as storage device 811. Execution of the sequences of instructions contained in main memory 807 causes processor 805 to perform the process steps described herein. One or more processors in a multi-processing arrangement may also be employed to execute the sequences of instructions contained in main memory 807. In alternative embodiments, hard-wired circuitry may be used in place of or in combination with software instructions. Thus, embodiments are not limited to any specific combination of hardware circuitry and software.

Further, the instructions associated with the processing of bandwidth requests may reside on a computer-readable medium. The term "computer-readable medium" as used herein refers to any medium that participates in providing instructions to processor 805 for execution. Such a medium may take many forms, including but not limited to, non-volatile media, volatile media, and transmission media. Non-volatile media includes, for example, optical or magnetic disks, such as storage device 811. Volatile media includes dynamic memory, such as main memory 807. Transmission media includes coaxial cables, copper wire and fiber optics, including the wires that comprise bus 803. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 805 for execution. For example, the instructions may initially be carried on a magnetic disk of a remote computer. The remote computer can load the instructions relating to bandwidth allocation remotely into its dynamic memory and send the instructions over a telephone line using a modem. A modem local to computer system 801 can receive the data on the telephone line and use an infrared transmitter to convert the data to an infrared signal. An infrared detector coupled to bus 803 can receive the data carried in the infrared signal and place the data on bus 803. Bus 803 carries the data to main memory 807, from which processor 805 retrieves and executes the instructions. The instructions received by main memory 807 may optionally be stored on storage device 811 either before or after execution by processor 805.

Computer system 801 also includes a communication interface 819 coupled to bus 803. Communication interface 819 provides a two-way data communication coupling to a network link 821 that is connected to a local network 823. For example, communication interface 819 may be a network interface card to attach to any packet switched local area network (LAN). As another example, communication interface 819 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 819 sends and receives electrical, electromagnetic or optical signals that carry digital data streams representing various types of information.

Network link 821 typically provides data communication through one or more networks to other data devices. For example, network link 821 may provide a connection through local network 823 to a host computer 825 or to data equipment operated by a service provider, which provides data communication services through a communication network 827 (e.g., the Internet). LAN 823 and network 827 both use electrical, electromagnetic or optical signals that carry digital data streams. The signals through the various networks and the signals on network link 821 and through communication interface 819, which carry the digital data to and from computer system 801, are exemplary forms of carrier waves transporting the information. Computer system 801 can transmit notifications and receive data, including program code, through the network(s), network link 821 and communication interface 819.

The techniques described herein provide several advantages over prior approaches performing bandwidth-on-demand (BoD) with respect to high volume traffic originating from multiple satellite terminals. A satellite communications system includes a satellite that has a switch and payload control computer to process bandwidth requests from the STs. The bandwidth request messages are submitted by the STs over a terrestrial communication network that is separate from the satellite communications system. A BCP is located remotely within a NOCC and transmits an assignment message that selectively specifies a bandwidth allocation over the communication network to the terminal. The BCP concurrently initiates transmission of a control message to the satellite to provide bandwidth allocation information to the payload control computer. The PCC, in turn, adjusts either the appropriate counters or threshold values to reflect the allocation that was made by the BCP. Under this arrangement, congestion within the PCC is mitigated.

Obviously, numerous modifications and variations of the present invention are possible in light of the above teachings. It is therefore to be understood that within the scope of the appended claims, the invention may be practiced otherwise than as specifically described herein.

What is claimed is:

1. A method for exchanging data in a communications system that includes a controller coupled to a switch, the method comprising:

receiving a message requesting bandwidth from a processor;

selectively granting the bandwidth request by a bandwidth controller;

transmitting an assignment message that specifies a bandwidth allocation based upon the granting step to the processor; and initiating transmission of a control message to the controller to provide bandwidth allocation information concurrently with the transmitting step;

wherein the communications system includes a satellite that includes the controller and the switch, the message requesting bandwidth in the receiving step being transmitted over a communication network that is separate from the satellite communications system; and wherein the switch includes a plurality of queues, each of the queues having a threshold value and storing data corresponding to a plurality of downlink cells based upon the threshold value, the controller including a plurality of counters corresponding to the plurality of queues.

2. The method according to claim 1, wherein the control message in the initiating step specifies a counter offset corresponding to one of the plurality of counters, the method further comprising:

adjusting the one counter based upon the counter offset value.

3. The method according to claim 1, wherein the control message in the initiating step specifies a threshold offset value corresponding to one of the threshold values, the method further comprising:

adjusting the one threshold value based upon the threshold offset value.

4. A communications system for exchanging data, the system comprising:

a bandwidth controller configured to receive a message requesting bandwidth from a remote processor and to selectively grant the bandwidth request, the bandwidth controller transmitting an assignment message that specifies a bandwidth allocation to the remote processor and concurrently transmitting a control message;

a switch configured to forward the assignment message to the remote processor; and a controller coupled to the switch and configured to receive the control message, the control message providing bandwidth allocation; and wherein the switch includes a plurality of queues, each of the queues having a threshold value and storing data corresponding to a plurality of destination terminals based upon the threshold value, the controller including a plurality of counters corresponding to the plurality of queues.

5. The system according to claim 4, wherein the control message in the specifies a counter offset corresponding to one of the plurality of counters, the one counter being adjusted based upon the counter offset value.

6. The system according to claim 4, wherein the control message specifies a threshold offset value corresponding to one of the threshold values, the one threshold value being based upon the threshold offset value.

7. A communications system having a controller coupled to a switch, the system comprising:

means for receiving a message requesting bandwidth from processor;

means for selectively granting the bandwidth request;

means for transmitting an assignment message that specifies a bandwidth allocation based upon the bandwidth request to the processor; and means for initiating transmission of a control message to the controller to provide bandwidth allocation information concurrently with the transmission of the assignment message; and wherein the communications system includes a satellite that includes the controller and the switch, the message requesting bandwidth being transmitted over a communication network that is separate from the satellite communications system; and wherein the switch includes a plurality of queues, each of the queues having a threshold value and storing data corresponding to a plurality of downlink cells based upon the threshold value, the controller including a plurality of counters corresponding to the plurality of queues.

8. The system according to claim 7, wherein the control message specifies a counter offset corresponding to one of the plurality of counters, the system further comprising:

means for adjusting the one counter based upon the counter offset value.

9. The system according to claim 7, wherein the control message specifies a threshold offset value corresponding to one of the threshold values, the system further comprising:

means for adjusting the one threshold value based upon the threshold offset value.

10. A satellite communications system including a satellite having a payload control computer, comprising:

a switch coupled to the payload control computer and configured to forward data from a terminal, the terminal being configured to transmit a message requesting bandwidth over a communication network that is separate from the satellite communications system; and a bandwidth control processor located remotely from the payload control computer of the satellite and configured to transmit an assignment message that selectively specifies a bandwidth allocation over the communication network to the terminal, and to concurrently initiate transmission of a control message to the satellite to provide bandwidth allocation information to the payload control computer; and wherein the switch includes a plurality of queues, each of the queues having a threshold value and storing data corresponding to a plurality of downlink cells based upon the threshold value, the payload control computer including a plurality of counters corresponding to the plurality of queues.

11. The system according to claim 10, wherein the control message specifies a counter offset corresponding to one of the plurality of counters, wherein the one counter is adjusted based upon the counter offset value.

12. The system according to claim 10, wherein the control message specifies a threshold offset value corresponding to one of the threshold values, the one threshold value being adjusted based upon the threshold offset value.

13. A computer-readable medium carrying one or more sequences of one or more instructions for exchanging data in a communications system that includes a controller coupled to a switch, the one or more sequences of one or more instructions including instructions which, when executed by one or more processor, cause the one or more processor to perform the steps of:

receiving a message requesting bandwidth from a processor;

selectively granting the bandwidth request;

transmitting an assignment message that specifies a bandwidth allocation based upon the granting step to the processor; and initiating transmission of a control message to the controller to provide bandwidth allocation information concurrently with the transmitting step; and wherein the communications system includes a satellite that includes the controller and the switch, the message requesting bandwidth in the receiving step being transmitted over a communication network that is separate from the satellite communications systems; and wherein the switch includes a plurality of queues, each of the queues having a threshold value and storing data corresponding to a plurality of downlink cells based upon the threshold value, the controller including a plurality of counters corresponding to the plurality of queues.

14. The computer-readable medium according to claim 13, wherein the control message in the initiating step specifies a counter offset corresponding to one of the plurality of counters, the computer-readable medium further comprising computer-executable instructions for causing the one or more processors to perform the step of:

adjusting the one counter based upon the counter offset value.

15. The computer-readable medium according to claim 13, wherein the control message in the initiating step specifies a threshold offset value corresponding to one of the threshold values, the computer-readable medium further comprising computer-executable instructions for causing the one or more processors to perform the step of:

adjusting the one threshold value based upon the threshold offset value.

* * * * *